(12) United States Patent
Grimberg et al.

(10) Patent No.: US 10,724,919 B2
(45) Date of Patent: Jul. 28, 2020

(54) SYSTEMS AND METHODS FOR QUANTIFYING A GAS LEAK

(71) Applicant: OPGAL Optronic Industries Ltd., Karmiel (IL)

(72) Inventors: Ernest Grimberg, Karmiel (IL); Gil Abramovich, Karmiel (IL); Omer Yanai, Karmiel (IL)

(73) Assignee: OPGAL Optronic Industries Ltd., Karmiel (IL)

( * ) Notice: Subject to any disclaimer, the term of this patent is extended or adjusted under 35 U.S.C. 154(b) by 0 days.

(21) Appl. No.: 16/349,623

(22) PCT Filed: Nov. 13, 2017

(86) PCT No.: PCT/IL2017/051233
§ 371 (c)(1),
(2) Date: May 14, 2019

(87) PCT Pub. No.: WO2018/087768
PCT Pub. Date: May 17, 2018

(65) Prior Publication Data
US 2019/0346337 A1    Nov. 14, 2019

Related U.S. Application Data

(60) Provisional application No. 62/421,411, filed on Nov. 14, 2016.

(51) Int. Cl.
*H04N 5/33*        (2006.01)
*G01M 3/38*        (2006.01)
(Continued)

(52) U.S. Cl.
CPC .......... *G01M 3/38* (2013.01); *G01N 21/3504* (2013.01); *G01N 21/3581* (2013.01);
(Continued)

(58) Field of Classification Search
CPC .......... H04N 5/332; G01M 3/38; G06T 7/13; G06T 7/001; G06T 7/60; G08B 21/12;
(Continued)

(56) References Cited

U.S. PATENT DOCUMENTS 5,656,813 A    8/1997   Moore et al.
6,803,577 B2   10/2004  Edner et al.
(Continued)

OTHER PUBLICATIONS

International Search Report and Written Opinion of PCT Application No. PCT/IL2017/051233, dated Mar. 12, 2018.
(Continued)

*Primary Examiner* — Michael Lee
(74) *Attorney, Agent, or Firm* — Pearl Cohen Zedek Latzer Baratz LLP

(57) ABSTRACT

System and method of quantifying a gas leak in a specified field of view are disclosed. The system may comprise a cooled detector and two interchangeable band-pass non-cooled filters. A first non-cooled band-pass filter transmits electromagnetic radiation in a first spectral band that coincides with a non-transparent leaking gas spectral band. A second non-cooled band-pass filter transmits only electromagnetic radiation in a second spectral band which coincides with a transparent leaking gas spectral band. The system may comprise a quantification unit arranged to process the images generated by the cooled detector to thereby determine, based on the images thereof, a flowrate of the leaking gas in the specified field of view. The system may comprise a detection unit arranged to determine, based on alternately generated multiple first spectral band images and multiple second spectral band images, a gas leak in the specified field of view.

18 Claims, 14 Drawing Sheets

(51) Int. Cl.
*G06T 7/13* (2017.01)
*G01N 21/3504* (2014.01)
*G01N 21/3581* (2014.01)
*G02B 5/20* (2006.01)
*G06T 7/00* (2017.01)
*G06T 7/60* (2017.01)
*G08B 21/12* (2006.01)

(52) U.S. Cl.
CPC .............. *G02B 5/208* (2013.01); *G06T 7/001* (2013.01); *G06T 7/13* (2017.01); *G06T 7/60* (2013.01); *G08B 21/12* (2013.01); *H04N 5/332* (2013.01); *G01N 2201/063* (2013.01); *G06T 2207/10036* (2013.01); *G06T 2207/10048* (2013.01); *G06T 2207/20216* (2013.01)

(58) Field of Classification Search
CPC ............ G08B 21/3504; G08B 21/3581; G08B 2201/063; G08B 2207/10036; G08B 2207/10048; G08B 2207/20216; G02B 5/208
USPC ......................................................... 348/164
See application file for complete search history.

(56) References Cited

U.S. PATENT DOCUMENTS

| | | | |
|---|---|---|---|
| 6,853,452 B1 * | 2/2005 | Laufer | G01N 21/3504 356/436 |
| 7,189,970 B2 | 3/2007 | Racca et al. | |
| 7,687,776 B2 | 3/2010 | Baliga et al. | |
| 8,193,496 B2 | 6/2012 | Furry | |
| 8,432,451 B2 | 4/2013 | Cetin et al. | |
| 9,225,915 B2 | 12/2015 | Zeng et al. | |
| 9,562,849 B2 | 2/2017 | Kester et al. | |
| 9,581,543 B2 | 2/2017 | Cabib et al. | |
| 2008/0048121 A1 * | 2/2008 | Hinnrichs | G01J 5/061 250/340 |
| 2009/0079854 A1 | 3/2009 | Mangoubi et al. | |
| 2009/0200466 A1 * | 8/2009 | Mammen | G06T 5/50 250/330 |
| 2010/0284570 A1 | 11/2010 | Grimberg | |
| 2011/0044495 A1 | 2/2011 | Wolowelsky et al. | |
| 2013/0250124 A1 * | 9/2013 | Furry | G01N 33/0036 348/164 |
| 2015/0371374 A1 | 12/2015 | Zeng et al. | |
| 2015/0371386 A1 | 12/2015 | Zeng et al. | |
| 2016/0097713 A1 | 4/2016 | Kester et al. | |

OTHER PUBLICATIONS

Niklas Bährecke, "Automatic Classification and Visualization of Gas from Infrared Video Data", Master of Science Thesis in Medical Engineering, Royal Institute of Technology KTH STH, Stockholm Aug. 2015.

Sandsten et al., "Volume flow calculations on gas leaks imaged with infrared gas-correlation", Optics Express, vol. 20, No. 18, Aug. 27, 2012, pp. 20318-20329.

* cited by examiner

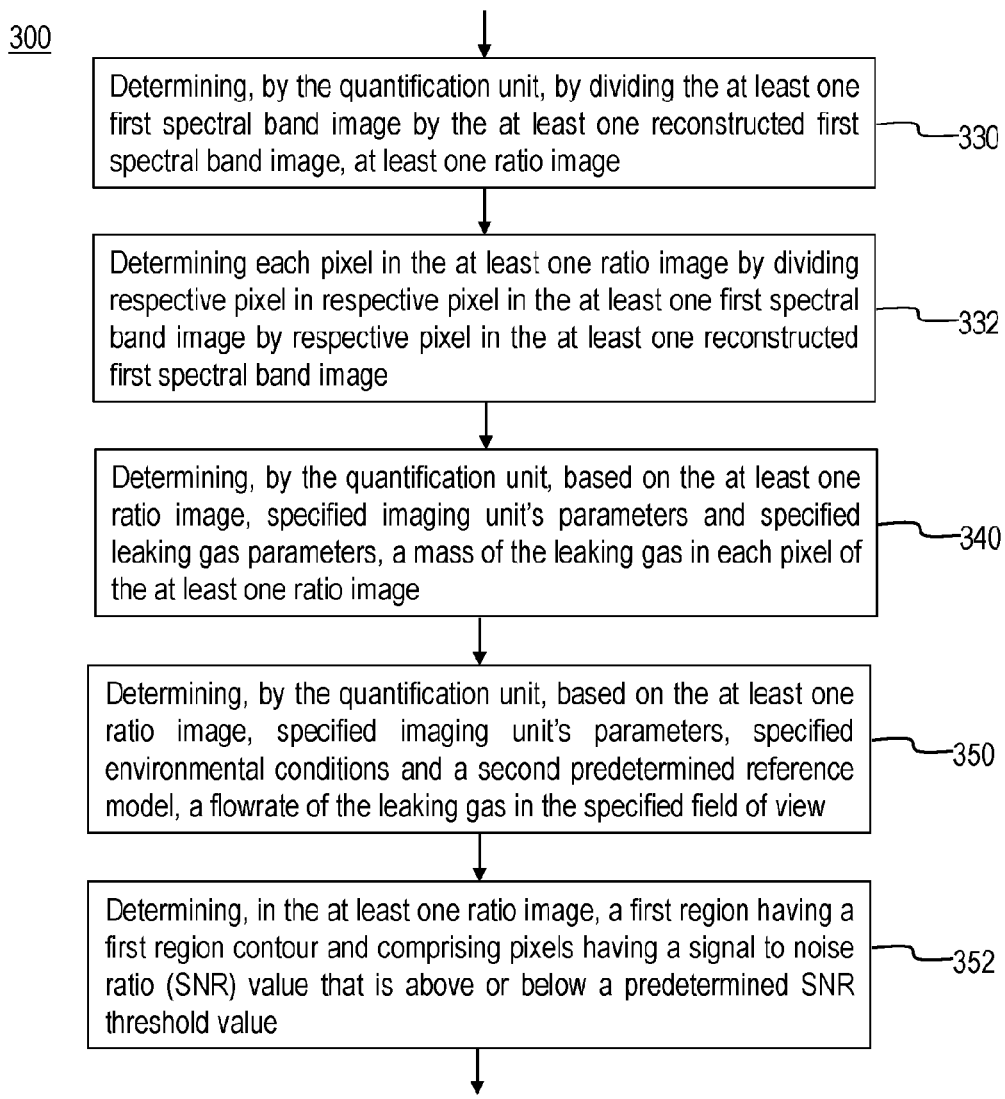
Figure 5 (cont. 1)

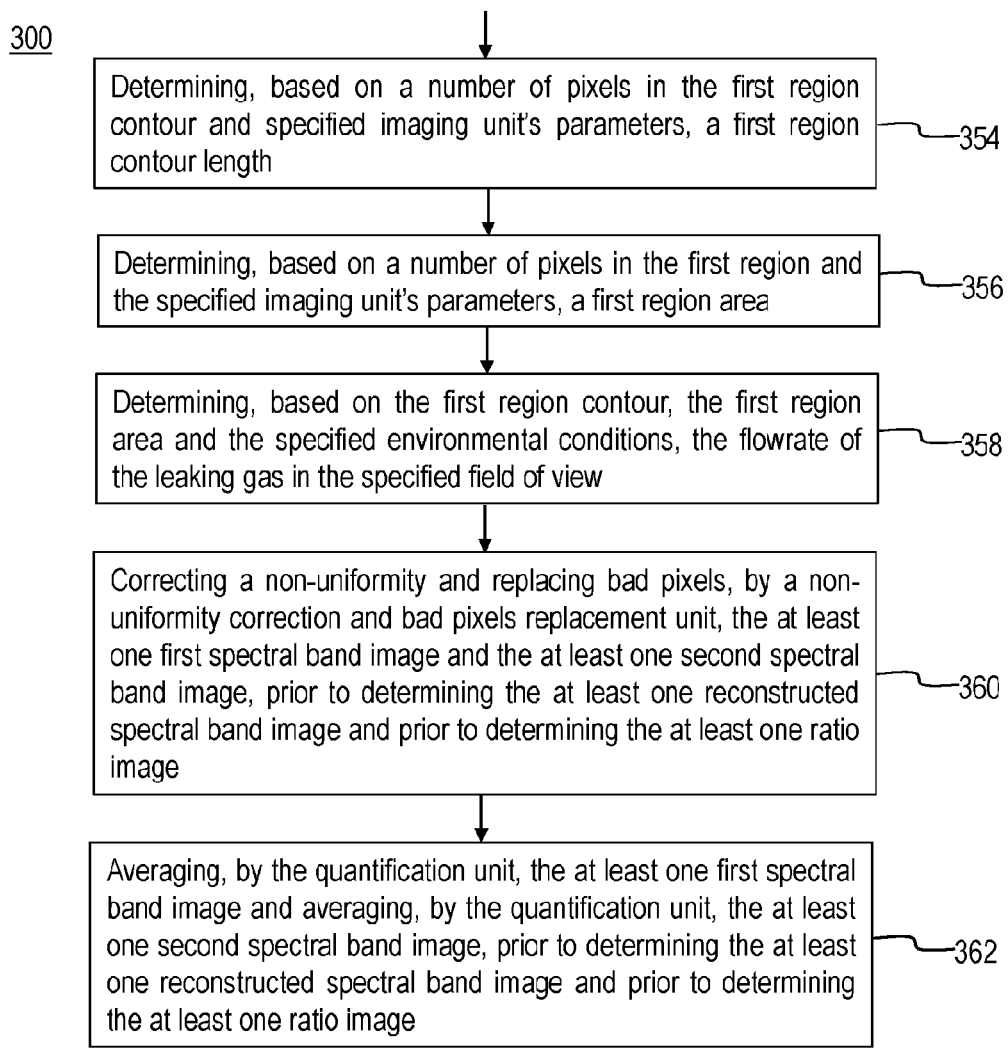
Figure 5 (cont. 2)

400

---

Determining, at each gas leak detection cycle, based on at least a portion of the multiple second spectral band images, a second change that is suspected as a gas leak in the specified field of view, and determining at least one second spectral band image of the multiple first spectral band images comprising the second change thereof ——422

↓

Determining, at each gas leak detection cycle, based on at least one of the determined first change, the determined second change, the at least one first spectral band image comprising the first change and the at least one second spectral band image comprising the second change, whether the first change and/or the second change is a gas leak ——424

↓

Determining a total number of gas leak detections in the predetermined number of gas detection cycles and further determining, based on the total number of gas detections and a predetermined gas leak detections threshold, whether activation of a gas leak alarm is required ——430

↓

Setting the predetermined gas leak detections threshold to reduce the false alarm ratio and/or to increase the probability of the gas leak alarm ——432

Figure 6 (cont. 1)

SYSTEMS AND METHODS FOR QUANTIFYING A GAS LEAK

CROSS-REFERENCE TO RELATED APPLICATIONS

This application is a National Phase Application of PCT International Application No. PCT/IL2017/051233, International Filing Date Nov. 13, 2017, entitled: "SYSTEMS AND METHODS FOR QUANTIFYING A GAS LEAK", published on May 17, 2018, under publication No. WO 2018/087768, which claims the benefit of U.S. Provisional Patent Application No. 62/421,411, filed on Nov. 14, 2016, which is hereby incorporated by reference in its entirety.

FIELD OF THE INVENTION

The present invention relates to the field of gas leak detection, and more particularly, to systems and methods for quantifying the gas leak.

BACKGROUND OF THE INVENTION

Oil, gas, chemical and power plant industries are constantly seeking for efficient in-situ detection of fugitive gas leakages. Most of the gases used (e.g., methane, propane, benzene, etc.) in these industries are highly explosive when mixed with air. Moreover, most of the leaking gases belong to the category of greenhouse gases and therefore contributing to climate instability and temperature increase. Further, the gas leakage problem is causing profit-losses to the industries thereof.

Typically, regulations in most of the developed countries require constant monitoring of equipment in order to control and reduce to minimum gas leakage. Today there are many different products that facilitate detection of volatile organic components (VOC) and other gases. Most of these products belong to a category named 'sniffers'. Sniffers provide accurate gas concentration readings but suffer from extensive labor related to the inspection process that has to be performed locally in close proximity with pipes valves or any other gas carrying components.

Optical gas detection systems are also known. Different gases are characterized by different absorption lines in different spectral bands, which may enable detecting different gases using different filters. Typically, optical gas detection systems include cooled detector and cooled band-pass filter(s), e.g., both located in a camera's dewar. The sensitivity of such systems is limited to a gas of a single type (or limited types of gases), due to, for example, disability of replacing the cooled band-pass filter(s) with different filters adapted for different types of gases.

SUMMARY OF THE INVENTION

One aspect of the present invention provides a system for quantifying a gas leak in a specified field of view, the system comprising: an imaging unit comprising a cryogenically cooled detector arranged to detect electromagnetic radiation within a specified spectral band; a filters assembly comprising: a first non-cooled band-pass filter arranged to transmit electromagnetic radiation ranging within a first spectral band; and a second non-cooled band-pass filter arranged to transmit electromagnetic radiation ranging within a second spectral band; wherein the first spectral band coincides with a non-transparent leaking gas spectral band in which the leaking gas emits and absorbs electromagnetic radiation, wherein the second spectral band coincides with a transparent leaking gas spectral band in which the leaking gas does not emit or absorb electromagnetic radiation, and wherein the specified spectral band includes the first spectral band and the second spectral band; wherein the cryogenically cooled detector is arranged to generate, using the first non-cooled band-pass filter, at least one first spectral band image of the field of view in the first spectral band and to generate using the second non-cooled band-pass filter, at least one second spectral band image of the field of view in the second spectral band; and an quantification unit arranged to: receive the at least one first spectral band image and to receive the at least one second spectral band image; determine, based on the at least one second spectral band image and a first predetermined reference model, at least one reconstructed first spectral band image of the specified field of view in the first spectral band assuming no gas leakage; and determine, by dividing (e.g., pixel by pixel or sample by sample) the at least one first spectral band image by the at least one reconstructed first spectral band image, at least one ratio image.

Another aspect of the present invention provides a method of quantifying a leaking gas in a specified field of view, the method comprising: generating, by a cryogenically cooled detector and using a first non-cooled band-pass filter, at least one first spectral band image of the specified field of view in a first spectral band coinciding with a non-transparent leaking gas spectral band in which the leaking gas emits and absorbs electromagnetic radiation and generating, by the cryogenically cooled detector and using a second non-cooled band-pass filter, at least one second spectral band image of the specified field of view in a second spectral band coinciding with a transparent leaking gas spectral band in which the leaking gas does not emit or absorbs electromagnetic radiation; determining, by an quantification unit, based on the at least one second spectral band image and a first predetermined reference model, at least one reconstructed first spectral band image of the specified field of view in the first spectral band assuming no gas leakage; and determining, by the quantification unit, by dividing (e.g., pixel by pixel or sample by sample) the at least one first spectral band image by the at least one reconstructed first spectral band image, at least one ratio image.

Another aspect of the present invention provides a system for automatically detecting a gas leak in a specified field of view, the system comprising: an imaging unit comprising a cryogenically cooled detector arranged to detect electromagnetic radiation within a specified spectral band; a filters assembly comprising: a first non-cooled band-pass filter arranged to transmit electromagnetic radiation ranging within a first spectral band; and a second non-cooled band-pass filter arranged to transmit electromagnetic radiation ranging within a second spectral band; wherein the first spectral band coincides with a non-transparent leaking gas spectral band in which the leaking gas emits and absorbs electromagnetic radiation, wherein the second spectral band coincides with a transparent leaking gas spectral band in which the leaking gas does not emit or absorb electromagnetic radiation, and wherein the specified spectral band includes the first spectral band and the second spectral band; wherein the cryogenically cooled detector is arranged to generate alternately, at each gas leak detection cycle of a predetermined number of gas leak detection cycles, multiple first spectral band images of the specified field of view in the first spectral band using the first non-cooled band-pass filter and multiple second spectral band images of the specified field of view in the second spectral band using the second non-cooled band-pass filter; and a detection unit arranged to: receive, at each gas leak detection cycle of the predetermined number of gas leak detection cycles, the alternately generated multiple first spectral band images and multiple second spectral band images; determine, at each gas leak detection cycle, based on at least a portion of the multiple first spectral band images, a first change that is suspected as a gas leak in the specified field of view, and to determine at least one first spectral band image of the multiple first spectral band images comprising the first change thereof; determine, at each gas leak detection cycle, based on at least a portion of the multiple second spectral band images, a second change that is suspected as a gas leak in the specified field of view, and to determine at least one second spectral band image of the multiple first spectral band images comprising the second change thereof; determine, at each gas leak detection cycle, based on at least one of the determined first change, the determined second change, the at least one first spectral band image comprising the first change and the at least one second spectral band image comprising the second change, whether the first change and/or the second change is a gas leak; and determine a total number of gas leak detections in the predetermined number of gas detection cycles and further to determine, based on the total number of gas detections and a predetermined gas leak detections threshold, whether activation of a gas leak alarm is required.

Another aspect of the present invention provides a method of an automatic detection of a gas leak in a specified field of view, the method comprising: generating alternately, at each gas leak detection cycle of a predetermined number of gas leak detection cycles, by a cooled detector and using a first non-cooled band-pass filter, multiple first spectral band images in a first spectral band, and by the detector and using a second non-cooled band-pass filter, multiple second spectral band images in a second spectral band, wherein the first spectral band coincides with a non-transparent leaking gas spectral band in which the leaking gas emits and absorbs electromagnetic radiation, and wherein the second spectral band coincides with a transparent leaking gas spectral band in which the leaking gas does not emit or absorb electromagnetic radiation; determining, at each gas leak detection cycle, based on at least a portion of the multiple first spectral band images, a first change that is suspected as a gas leak in the specified field of view, and determining at least one first spectral band image of the multiple first spectral band images comprising the first change thereof; determining, at each gas leak detection cycle, based on at least a portion of the multiple second spectral band images, a second change that is suspected as a gas leak in the specified field of view, and determining at least one second spectral band image of the multiple first spectral band images comprising the second change thereof; determining, at each gas leak detection cycle, based on at least one of the determined first change, the determined second change, the at least one first spectral band image comprising the first change and the at least one second spectral band image comprising the second change, whether the first change and/or the second change is a gas leak; and determining a total number of gas leak detections in the predetermined number of gas detection cycles and further determining, based on the total number of gas detections and a predetermined gas leak detections threshold, whether activation of a gas leak alarm is required, wherein the predetermined gas leak detections threshold is set to reduce the false alarm ratio and/or to increase the probability of the gas leak alarm.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
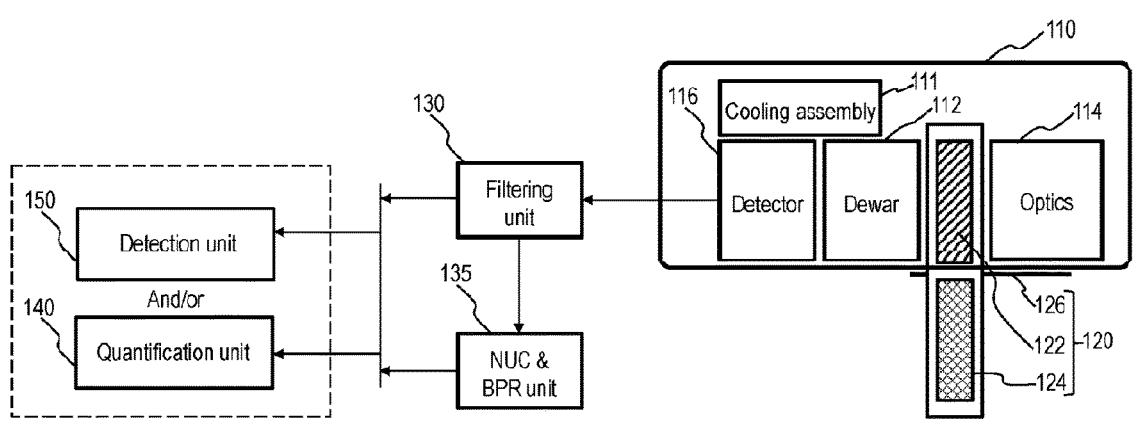
FIG. 1 is a schematic illustration of a system for quantifying a gas leak and/or for an automatic detection of the gas leak in a specified field of view, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, system and method of quantifying a gas leak in a specified field of view are disclosed. The system may comprise a cooled detector and optics, and two interchangeable band-pass non-cooled filters located between the optics and the detector. A first non-cooled band-pass filter transmits electromagnetic radiation in a first spectral band that coincides with a non-transparent leaking gas spectral band. A second non-cooled band-pass filter transmits only electromagnetic radiation in a second spectral band that coincides with a transparent leaking gas spectral band. The system may comprise a quantification unit arranged to process the images generated by the cooled detector to thereby determine, based on the images thereof, a flowrate of the leaking gas in the specified field of view. Further, the system may comprise a detection unit arranged to determine, based on alternately generated multiple first spectral band images and multiple second spectral band images, a gas leak in the specified field of view.

Reference is now made to FIG. 1, which is a schematic illustration of a system for quantifying a gas leak and/or for an automatic detection of the gas leak in a specified field of view, according to some embodiments of the invention.

System 100 may comprise an imaging unit 110 (e.g., infrared (IR) video or stills camera) comprising optics 114 in association with a detector 116. Optics 114 may be arranged to focus electromagnetic radiation onto detector 116 and/or to ensure a desired optical path of the electromagnetic radiation thereof. In some embodiments, detector 116 is a cryogenically cooled thermal detector (e.g., cryogenically cooled by a cooling assembly 111). Detector 116 may be arranged to operate (e.g., to detect electromagnetic radiation) within a specified spectral range. In various embodiments, detector 116 is arranged to operate within a mid-wave infrared (IR) range (e.g., to detect electromagnetic radiation ranging within 3-5 μm) and/or to operate within a longwave IR range (e.g., to detect electromagnetic radiation ranging within 7-14 μm). Detector 116 may be arranged to generate, based on the detected electromagnetic radiation, at least one image of the specified field of view. In some embodiments, the specified field of view comprises a leaking gas.

In some embodiments, the specified spectral band of detector 116 is determined based on a type of the leaking gas. For example, the specified spectral band may be set to range between 3-5 μm for leaking gases such as acetylene, ethane, heptane, hydrogen chloride, isobutane, isooctane, isopentane, octane and/or methane. It is noted that the specified spectral band of detector 116 may be set to different values based on, for example, the type of the leaking gas.

System 100 may comprise a filters assembly 120. Filters assembly 120 may comprise a first band-pass filter 122. First band-pass filter 122 may be a non-cooled filter (e.g., filter that is not subjected to any thermal stabilization means). First band-pass filter 122 may be arranged to transmit electromagnetic radiation ranging within a first spectral band. The first spectral band may be determined based on the type of the leaking gas. In some embodiments, the first spectral band is set to coincide with a non-transparent leaking gas spectral band in which the leaking gas emits and absorbs electromagnetic radiation.

For example, if the leaking gas is methane, the first spectral band may be set to range between 3.15-3.45 μm in which methane emits and absorbs electromagnetic radiation. In various embodiments, the leaking gas has several spectral bands in which it emits or absorbs electromagnetic radiation, and/or the first spectral band is set to coincide with the optimal leaking gas spectral band.

Filters assembly 120 may comprise a second band-pass filter 124. Second band-pass filter 122 may be a non-cooled filter (e.g., filter that is not subjected to any temperature stabilization means). Second band-pass filter 124 may be arranged to transmit electromagnetic radiation ranging within a second spectral band. The second spectral band may be determined based on at least one of the first spectral band of first band-pass filter 122 and/or the specified spectral band of detector 116. In some embodiments, the second spectral band is set to coincide with a transparent leaking gas spectral band in which the leaking gas does not emit or absorb electromagnetic radiation. For example, referring to methane as an example for the leaking gas, the second spectral band may be set to range between 3.45-5 μm, in which methane is transparent (e.g., does not emit or absorb electromagnetic radiation). In some embodiments, the specified spectral band of detector 116 includes the first spectral band of first band-pass filter 122 and the second spectral band of second band-pass filter 124. For example, referring to methane as an example for the leaking gas, the specified spectral band of detector 116 may be set range between 3-5 μm thereby including the first spectral band ranging between 3.15-3.45 μm and the second spectral band ranging between 3.45-5 μm.

In various embodiments, the first spectral band and/or the second spectral band are set to be in a transparent atmosphere spectral band in which the atmosphere does not emit or absorb radiation. In various embodiments, the first spectral band and/or the second spectral band are further set such that detector 116 is capable of translating the detected photons into photoelectrons in such a way that it may be used to generate a real-time image.

Filters assembly 120 may comprise a filters-switching mechanism 126. Filters switching mechanism 126 may be arranged to interchange between first band-pass filter 122 and second band-pass filter 124 to thereby position first band-pass filter 122 or second band-pass filter 124 between detector 116 (or a dewar 112) and optics 114. In various embodiments, filters switching mechanism 126 comprises, for example, sliding (not shown) or pivoting mechanism (e.g., as shown in FIG. 1).

In various embodiments, first band-pass filter 122 and/or second band-pass filter 124 are changeable, e.g., may be replaced with other filters, based on, for example, the type of the leaking gas being detected and/or quantified.

The electromagnetic radiation being transmitted by a non-cooled filter (e.g., first band-pass filter 122 and second band-pass filter 124) to a detector (e.g., detector 116) may be not in focus. The spatial contribution of the non-cooled band-pass filters to the images being generated by the detector may have a Gaussian-like form and may comprise low spatial frequencies. Such spatial contribution of the non-cooled filters may lead to, for example, non-uniformities in the generated images. System 100 may comprise a filtering unit 130 arranged to apply a digital two-dimensional high-pass filter to the images generated by detector 116 to thereby filter the spatial contribution of the non-cooled filters (e.g., first band-pass filter 122 and second band-pass filter 124) in the images thereof.

Detector 116 may be arranged to generate, using first band-pass filter 122, at least one first spectral band image of the specified field of view in the first spectral band. Detector 116 may be arranged to generate, using second spectral band-pass filter 124 (e.g., upon interchanging between first spectral band-pass filter 122 and second spectral band-pass filter 124, e.g., by filters switching mechanism 126), at least one second spectral band image of the specified field of view in the second spectral band.

In various embodiments, each of the at least one first spectral band image and/or of the at least one second spectral band image are one of stills image(s) or video image(s). In some embodiments, system 100 is a passive imaging system in which the at least one first spectral band image and the at least one second spectral band image are acquired without an external illumination. In some embodiments, system 100 may be an active imaging system in which the at least one first spectral band image and the at least one second spectral band image are acquired with an external illumination.

System 100 may comprise a non-uniformity correction (NUC) and bad pixels replacement (BPR) unit 135. In various embodiments, NUC-BPR unit 135 is arranged to perform NUC and BPR of the at least one first spectral band image and/or of the at least one second spectral band image. NUC and BPR may be arranged to, for example, reduce noise in the at least one first spectral band image and/or in the at least one second spectral band image generated by detector 116.

According to some embodiments, system 100 comprises a quantification unit 140. Quantification unit 140 may be arranged to receive the at least one first spectral band image of the specified field of view and to receive the at least one second spectral band image of the specified field of view. In some embodiments, quantification unit 140 is arranged to determine, based on the at least one first spectral band image and the at least one second spectral band image, a mass of the leaking gas in the specified field of view (e.g., as described below with respect to FIG. 2A). In some embodiments, quantification unit 140 is arranged to determine, based on the at least one first spectral band image and the at least one second spectral band image, a flowrate of the leaking gas in the specified field of view (e.g., as described below with respect to FIG. 2A).

According to some embodiments, system 100 comprises a detection unit 150. Detection unit 150 may be arranged to automatically detect the gas leak in the specified field of view (e.g., as described below with respect to FIG. 2B). System 100 may be arranged to perform a predetermined number of a gas leak detection cycles to thereby detect the gas leak. Each gas leak detection cycle may comprise generating, alternately, multiple first spectral band images in the first spectral band (e.g., by detector 116 and using first band-pas filter 122), and multiple second spectral band images in the second spectral band (e.g., by detector 116 and using second band-pass filter 124) and further determining, based on the multiple first spectral band images and the multiple second spectral band images, the gas leak (e.g., as described below with respect to FIG. 2B). In various embodiments, each of the multiple first spectral band images and/or of the multiple second spectral band images are one of stills image(s) or video image(s).

In some embodiments, system 100 comprises quantification unit 140 only. In some embodiments, system 100 comprises detection unit 150 only. In some embodiments, system 100 comprises quantification unit 140 and detection unit 150.

Figure 2A:
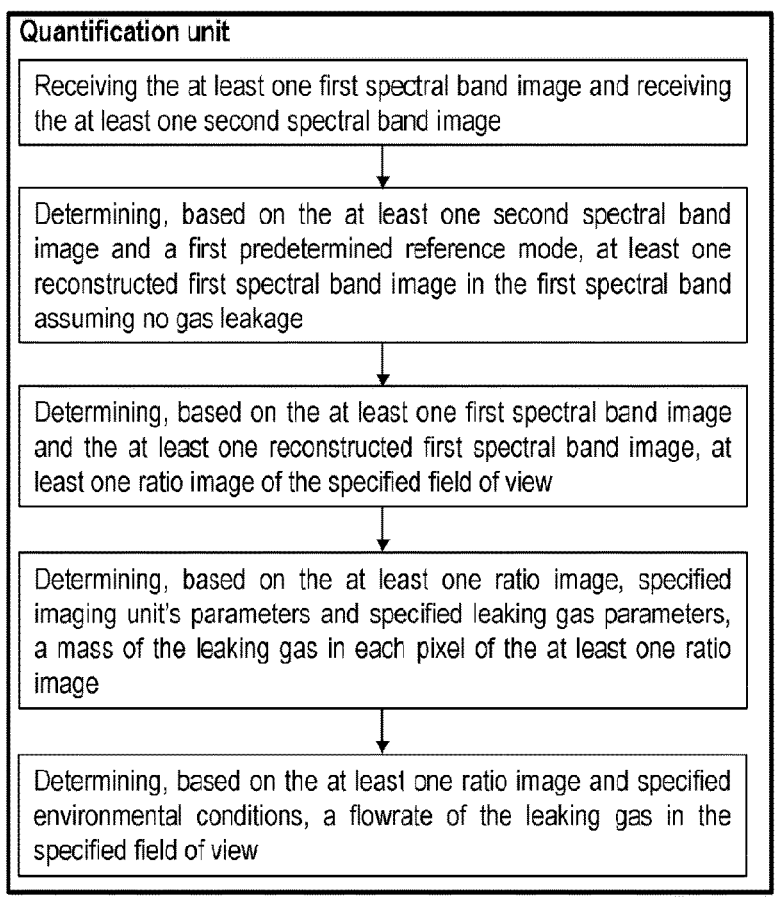
FIG. 2A is a flowchart of a method performed by a quantification unit of a system for quantifying a gas leak and/or for an automatic detection of the gas leak, according to some embodiments of the invention.

Reference is now made to FIG. 2A, which is a flowchart of a method performed by a quantification unit, such as quantification unit 140, of a system for quantifying a gas leak and/or for an automatic detection of the gas leak, such as system 100, according to some embodiments of the invention.

Quantification unit 140 may be arranged to receive the at least one first spectral band image of the specified field of view and to receive the at least one second spectral band image of the specified field of view. In various embodiments, quantification unit 140 receives the at least one first spectral band image and/or the at least one second spectral band image after the NUC and BPR, e.g., performed by NUC-BPD unit 135 (e.g., as described above with respect to FIG. 1).

In some embodiments, the at least one first spectral band image comprises multiple temporally-sequential first spectral band images of the specified field of view and/or the at least one second spectral band image comprises multiple temporally-sequential second spectral band images of the specified field of view. Quantification unit 140 may be further arranged to determine for each pixel of the at least one first spectral band image, a respective pixel's average value, based on respective pixels' values of the multiple temporally-sequential first spectral band images and/or to determine for each pixel of the at least one second spectral band image, a respective pixel's average value, based on respective pixels' values of the multiple temporally-sequential second spectral band images. The averaging thereof may be arranged to, for example, reduce a noise in the at least one first spectral band image and the at least one second spectral band image to thereby improve the signal to noise (SNR) ratio of the images thereof.

In some embodiments, quantification unit 140 is arranged to perform registration of the at least one first spectral band image with respect to the at least one second spectral band image. In some embodiments, the registration is performed by correlating the at least one first spectral band image with respect to the at least one second spectral band image. The registration thereof may be arranged to correct offsets of the at least one first spectral band image with respect to the at least one second spectral band image. The offsets may be due to, for example, system 100 displacements and/or differences between first band-pass filter 122 and second band-pass filter 124 (e.g., due to filters' non-uniformities and/or misalignment between the filters thereof).

Quantification unit 140 may be arranged to determine, based on the at least one second spectral band image of the specified field of view and a first predetermined reference model, at least one reconstructed first spectral band image of the specified field of view in the first spectral band assuming no gas leakage. In some embodiments, the first predetermined reference model comprises a transformation that transforms each pixel in the at least one second spectral band image to respective pixel in the reconstructed first spectral band image.

For example, the reconstructed first spectral band image $P\_rec_{i,j}$ (where i,j represent pixels indexes) may be based on the at least one second spectral band image $P\_second_{i,j}$, a detector's 116 exposure time during generation the at least one first spectral band image $\Delta t\_first_{ex}$, and a detector's 116 exposure time during generation of the at least one second spectral band image $\Delta t\_second_{ex}$. Equation 1 shows the reconstructed image $P\_rec_{i,j}$ as follows:

$$P\_rec_{i,j} = \Delta t\_first_{ex} \cdot f\left(1, \left(\frac{P\_second_{i,j}}{\Delta t\_second_{ex}}\right)^k, \left(\frac{P\_second_{i,j}}{\Delta t\_second_{ex}}\right)^{k-1}, \left(\frac{P\_second_{i,j}}{\Delta t\_second_{ex}}\right)^{k-2}, \ldots\right) \quad \text{(Equation 1)}$$

It is noted that k in Equation 1 represents the polynomial degree. It is also noted that more complex mathematical models may be used for the predetermined reference model.

In various embodiments, the first reference model is determined based on a plurality of first spectral band images and a plurality of second spectral band images generated for a plurality of predetermined conditions and/or for a plurality of various gases. The plurality of predetermined conditions may comprise, for example, a plurality of predetermined leaking gas temperature values, a plurality of predetermined ambient temperature values, a plurality of background temperature values and/or a plurality of leaking gas concentration values.

Quantification unit 140 may be arranged to determine, based on the at least one first spectral band image and the at least one reconstructed first spectral band image, at least one ratio image of the specified field of view. In some embodiments, the at least one ratio image is determined by diving each pixel in the at least one first spectral band image by corresponding pixel in the at least one reconstructed first spectral band image. In some embodiments, the ratio image may comprise information concerning the emissivity (or absorption) caused by the leaking gas.

For example, each pixel in the at least one ratio image $P\_first_{i,j}/P\_rec_{i,j}$ (e.g., the ratio of the at least one first spectral band image $P\_first_{i,j}$ to the at least one reconstructed first spectral band image $P\_rec_{i,j}$) may be based on respective pixel's value of a leaking gas value density $\rho_{Ngas}$ (e.g., in units of [# molecules/cm$^3$]), a leaking gas absorption coefficient $\mu_{gas}$ (e.g., in units of [cm$^2$/# molecules]) and an optical path between detector 116 and a gas leaking source $L_{opt}$ (e.g., in units of [cm]). For example, Equation 2 shows the at least one ratio image as follows:

$$\frac{P\_fisrt_{i,j}}{P\_rec_{i,j}} = [\exp(-\mu_{gas} \cdot \rho_{Ngas} \cdot L_{opt})]_{i,j} \quad \text{(Equation 2)}$$

Quantification unit 140 may be arranged to determine, based on the at least one ratio image, specified imaging unit's 110 parameters and specified leaking gas parameters, a mass of the leaking gas in each pixel of the at least one ratio image.

The following description shows, for example, the quantification of the leaking gas mass in the at least one ratio image.

The mass of the leaking gas in each pixel in the at least one ratio image $(Gas_{mass})_{i,j}$ may be based on the respective pixel's leaking gas value density $(\rho_{Ngas})_{i,j}$, the respective pixel's instantaneous field of view (IFOV) volume $(V_{IFOV})_{i,j}$ (e.g., in units of [cm$^3$]), the leaking gas molecular weight $MW_{gas}$ (e.g., in units of [gr/mol]) and Avogadro constant (e.g., in units of [# molecules/mol]). For example, Equation 3 shows the mass of the leaking gas in each pixel in the at least one ratio image $(Gas_{mass})_{i,j}$ as follows:

$$(Gas_{mass})_{i,j} = \frac{MW_{gas}}{6.022 \cdot 10^{23}} \cdot (\rho_{Ngas})_{i,j} \cdot (V_{IFOV})_{i,j} \quad \text{(Equation 3)}$$

The value density of the leaking gas in each pixel in the at least one ratio image $(\rho_{Ngas})_{i,j}$ may be based on the respective pixel in the at least one ratio image, the leaking gas absorption coefficient $\mu_{gas}$ and the optical path $L_{opt}$. For example, Equation 4 shows the value density of the leaking gas in each pixel in the at least one ratio image $(\rho_{Ngas})_{i,j}$ as follows:

$$(\rho_{gas})_{i,j} = \frac{\ln\left(\frac{P\_rec_{i,j}}{P\_first_{i,j}}\right)}{\mu_{gas} \cdot L_{opt}} \quad \text{(Equation 4)}$$

The volume of IFOV of each pixel in the at least one ratio image $(V_{IFOV})_{i,j}$ (e.g., in units of [cm$^3$]) may be based on a respective pixel's area of IFOV $(A_{IFOV})_{i,j}$, (e.g., in units of [cm$^2$]) an area of optics' 114 (e.g., lens' area) $A_{lens}$ (e.g., in units of [cm$^2$]) and the optical path $L_{opt}$. For example, Equation 5 shows the volume of IFOV of each pixel in the at least one ratio image $(V_{IFOV})_{i,j}$ as follows:

$$(V_{IFOV})_{i,j} = \frac{(A_{IFOV})_{i,j} + A_{lens}}{2} \cdot L_{opt} \quad \text{(Equation 5)}$$

The area of the respective pixel's IFOV $(A_{IFOV})_{i,j}$ may be based on a detector's 116 pitch $D_{pt}$ (e.g., in units of [cm]), an optics' 114 focal length FL (e.g., in units of [cm]) and the optical length $L_{opt}$. For example, Equation 6 shows the area of the respective pixel's IFOV $(A_{IFOV})_{i,j}$ as follows:

$$(A_{IFOV})_{i,j} = \left(\frac{D_{pt}}{FL} \cdot L_{opt}\right)^2 \quad \text{(Equation 6)}$$

The area of optics' 110 (e.g., lens' area) $A_{lens}$ may be based on the optics' 114 focal length FL and optics' 114 f-number F #. For example, Equation 7 shows the area of optics' 110 (e.g., lens' area) $A_{lens}$ as follows:

$$A_{lens} = \frac{\pi}{4}\left(\frac{FL}{F\#}\right)^2 \quad \text{(Equation 7)}$$

In various embodiments, the detector's 116 pitch is $D_{pt}=30 \cdot 10^{-4}$ cm, the optics' 114 focal length is FL=3 cm and the optics' 114 f-number is F #≈1. Accordingly, in various embodiments, the area of the respective pixel's IFOV is $(A_{IFOV})_{i,j}=9 \cdot 10^{-2}$ cm$^2$ and the area of optics' 114 is $A_{lens}=7$ cm$^2$. Since the area of the respective pixel's IFOV $(A_{IFOV})_{i,j}$ is negligible as compared to the area of the optics' 114 $A_{lens}$, the volume of the respective pixel's IFOV $(V_{IFOV})_{i,j}$ may be based on, for example, the optics' 114 area $A_{lens}$ and the optical length $L_{opt}$. For example, Equation 8 shows the volume of the respective pixel's IFOV $(V_{IFOV})_{i,j}$ in the at least one ratio image as follows:

$$(V_{IVOF})_{i,j} = \frac{\pi}{8}(FL)^2 \cdot L_{opt} \quad \text{(Equation 8)}$$

As a result, the mass of the leaking gas in each pixel in the at least one ratio image $(Gas_{mass})_{i,j}$ (e.g., in units of [gr]) may be based on the respective pixel in the at least one ratio image P_first$_{i,j}$/P_rec$_{i,j}$, the leaking gas absorption coefficient $\mu_{gas}$, the detector's 116 focal length FL, the leaking gas molecular mass MW$_{gas}$ and Avogadro constant. For example, Equation 9 shows the mass of the leaking gas in each pixel in the at least one ratio image $(Gas_{mass})_{i,j}$ as follows:

$$(Gas_{mass})_{i,j} = \frac{MW_{gas}}{6.022 \cdot 10^{23}} \frac{\pi}{8} \frac{\ln\left(\frac{P\_rec_{i,j}}{P\_first_{i,j}}\right)}{\mu_{gas}} \cdot (FL)^2 \cdot L_{opt} \quad \text{(Equation 9)}$$

The total mass of the leaking gas in the at least one ratio image of the specified field of view may be determined by summarizing the mass of the leaking gas in all pixels in the at least one ratio image. For example, Equation 10 shows the total mass of the leaking gas in the at least one ratio image Gas$_{mass}$ (e.g., in units of [gr]) as follows:

$$Gas_{mass} = \frac{MW_{gas}}{6.022 \cdot 10^{23}} \sum_i \sum_j \frac{\pi}{8} \frac{\ln\left(\frac{P\_rec_{i,j}}{P\_first_{i,j}}\right)}{\mu_{gas}} \cdot (FL)^2 \cdot L_{opt} \quad \text{(Equation 10)}$$

Quantification unit 140 may be arranged to determine, based on the at least one ratio image, specified imaging unit's 110 parameters, specified environmental conditions and a second predetermined reference model, a flowrate of the leaking gas in the specified field of view.

In various embodiments, quantification unit 140 is arranged to determine, in the at least one ratio image, a first region comprising pixels having a signal to noise ratio (SNR) value that is above or below a predetermined SNR threshold value. For example, if the background has higher temperature as compared to the leaking gas temperature, the pixels comprising the leaking gas emissivity will have lower signal (e.g., video signal) value as compared to pixels comprising the background emissivity. In another example, if the background has lower temperature as compared to the leaking gas temperature, the pixels comprising the leaking gas emissivity will have larger signal (e.g., video signal) value as compared to pixels comprising the background emissivity. The SNR threshold value is determined based on, for example, a sensitivity of detector 116 (e.g., the ability of detector 116 to detect electromagnetic radiation being emitted or absorbed by the leaking gas).

In some embodiments, quantification unit 140 is arranged to determine a number of pixels in a first region contour of the first region. In some embodiments, quantification unit 140 is further arranged to determine, based on the number of pixels in the first region contour and specified imaging unit's 110 parameters, a first region contour length of the first region contour.

The first region contour length $L_{cont}$ (e.g., in units of [cm]) may be based on the number of pixels in the first region contour $N_{cont\_pix}$, the detector's 116 pitch $D_{pt}$, the optics' 114 focal length FL and the optical length $L_{opt}$. For example, Equation 11 shows the contour length $L_{cont}$ as follows:

$$L_{cont} = N_{cont\_pix} \cdot 2 \cdot tg^{-1}\left(\frac{D_{pt}}{FL}\right) \cdot L_{opt} \quad \text{(Equation 11)}$$

In some embodiments, quantification unit 140 is arranged to determine a number of pixels in the first region. In some embodiments, quantification unit 140 is further arranged to determine, based on the number of pixels in the first region and specified imaging unit's 110 parameters, a first region area of the first region. The first region area $A_{reg}$ (e.g., in units of [cm$^2$]) may be based on the number of pixels in the first region $N_{reg\_pix}$, the detector's 116 pitch $D_{pt}$, the optics' 114 focal length FL and the optical length $L_{opt}$. For example, Equation 12 shows the first region area as follows:

$$A_{reg} = N_{reg\_pix} \cdot \left(2 \cdot tg^{-1}\left(\frac{D_{pt}}{FL}\right) \cdot L_{opt}\right)^2 \quad \text{(Equation 12)}$$

In some embodiments, quantification unit 140 is arranged to determine, based on the first region contour length, the first region area, specified environmental conditions (e.g., a leaking gas temperature, an ambient temperature and/or a wind velocity) and a second reference model, the flowrate of the leaking gas in the specified field of view.

In various embodiments, the second reference model is determined based on a plurality of the ratio images generated for a plurality of predetermined temperature values and a plurality of predetermined environmental conditions (e.g., various gas temperature values, various ambient temperature values and/or various wind velocities) and/or for a plurality of various gases.

In some embodiments, the flowrate of the leaking gas $Q_{gas}$ (e.g., in units of [gr/hour]) is based on the first region contour length $L_{cont}$, the first region area $A_{reg}$, a leaking gas temperature $T_{gas}$ (e.g., in units of [° C.]), an ambient temperature $T_{amb}$ (e.g., in units of [° C.]) and a wind velocity $V_{wind}$ (e.g., in units of [cm/sec]). For example, Equation 13 shows the flowrate of the leaking gas $Q_{gas}$ as follows:

$$Q_{gas} = f\left(\sum_k E_k\left(\frac{A_{reg}}{T_{gas} - T_{amb}}\right)^k, \sum_l R_l\left(\frac{L_{cont}}{T_{gas} - T_{amb}}\right)^l, V_{wind}\right) \quad \text{(Equation 13)}$$

It is noted that k, l in Equation 13 are polynomial degrees and $E_k$, $R_l$ are polynomial constants.

In some embodiments, the ambient temperature is determined based on, for example, a direct measurement by a thermometer. In various embodiments, the leaking gas temperature is determined based on, for example, a direct measurement of the leaking gas in the leaking source by a thermometer and/or based on a radiometric temperature of the leaking gas in the leaking source. The radiometric temperature of the leaking gas in the leaking source may be determined based on, for example, the at least one second spectral band image.

In some embodiments, quantification unit 140 is arranged to determine the flowrate of the leaking gas in the specified field of view, based on the at least one ratio image, the specified imaging unit's 110 parameters, the specified environmental conditions, the second predetermined reference model, and further based on the mass of the leaking gas in the at least one ratio image.

Figure 2B:
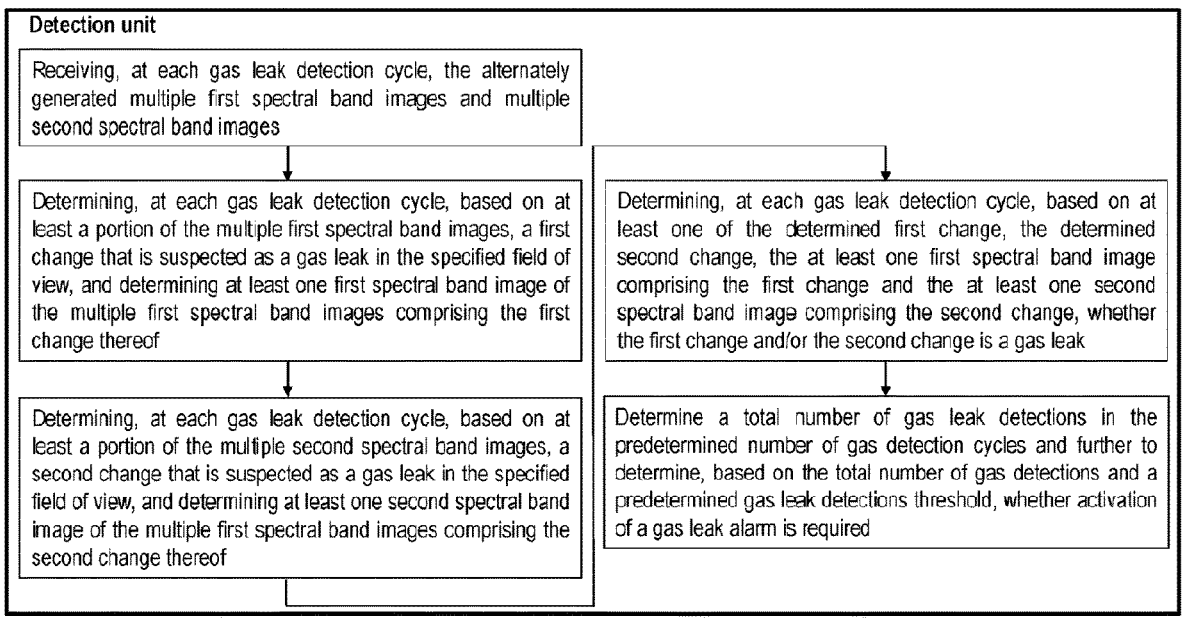
FIG. 2B is a flowchart of a method performed by a detection unit of a system for quantifying a gas leak and/or for an automatic detection of the gas leak, according to some embodiments of the invention.

Reference is now made to FIG. 2B, which is a flowchart of a method performed by a detection unit, such as detection unit 150, of a system for quantifying a gas leak and/or for an automatic detection of the gas leak, such as system 100, according to some embodiments of the invention.

According to some embodiments, system 100 may be arranged to perform a predetermined number of gas leak detection cycles to thereby detect the gas leak. Each gas leak detection cycle may comprise generating, alternately, multiple first spectral band images in the first spectral band (e.g., by detector 116 and using first band-pas filter 122), and multiple second spectral band images in the second spectral band (e.g., by detector 116 and using second band-pass filter 124) and further determining, based on the multiple first spectral band images and the multiple second spectral band images, the gas leak.

Detection unit 150 may be arranged to receive, at each gas leak detection cycle of the predetermined number of gas leak detection cycles, the alternately generated multiple first spectral band images and multiple second spectral band images.

Detection unit 150 may be arranged to determine, at each gas leak detection cycle, based on at least a portion of the multiple first spectral band images, a first change that is suspected as a gas leak in the specified field of view, and to determine at least one first spectral band image of the multiple first spectral band images comprising the first change thereof. In some embodiments, detection unit 150 is arranged to compare the at least portion of the multiple first spectral band images (e.g., using correlation or cross-correlation) to thereby determine the first change.

Detection unit 150 may be arranged to determine, at each gas leak detection cycle, based on at least a portion of the multiple second spectral band images, a second change that is suspected as a gas leak in the specified field of view, and to determine at least one second spectral band image of the multiple first spectral band images comprising the second change thereof. In some embodiments, detection unit 150 is arranged to compare the at least portion of the multiple second spectral band images (e.g., using correlation or cross-correlation) to thereby determine the second change.

In various embodiments, the first change and/or the second change that are suspected as a gas leak may be due to, for example, air turbulence, water vapors release, steam release, dust flow and/or the gas leak in the specified field of view.

Detection unit 150 may be arranged to determine, at each gas leak detection cycle, based on at least one of the determined first change, the determined second change, the at least one first spectral band image comprising the first change and the at least one second spectral band image comprising the second change, whether the first change and/or the second change is a gas leak.

For example, if the first change is determined in at least one first spectral band image of the multiple first spectral band images, and if no second change is detected in the multiple second spectral band images, the first change may be indicated as a gas leak in the specified field of view.

In another example, if no first changes detected in the multiple first spectral band images, and if the second change is detected in at least one second spectral band image of the multiple second spectral band images, the second change may be indicated as, for example, air turbulence, water vapors release, steam release or dust flow, but not as a gas leak.

In another example, if the first change is detected in at least one first spectral band image of the multiple first spectral band images, and if the second changed is detected in at least one second spectral band image of the multiple second spectral band images, detection unit 150 may be arranged to compare the at least one first spectral band image comprising the first change and the at least one second spectral band image comprising the second change to thereby determine whether the first change and/or the second change is a gas leak.

In various embodiments, detection unit 150 may be arranged to determine, based on the at least one first spectral band image comprising the first change, a first absorption value, to determine, based on the at least one second spectral band image comprising the second change, a second absorption value, and/or further to determine, based on the first absorption value and the second absorption value, whether the first change and/or the second change is a gas leak. For example, if the first absorption value is larger as compared to the second absorption value, the first change may be indicated as a gas leak. In another example, if the second absorption value is greater as compared to the first absorption value, the second change is not indicated as a gas leak.

Detection unit 150 may be further arranged to determine a total number of gas leak detections in the predetermined number of gas detection cycles and further to determine, based on the total number of gas detections and a predetermined gas leak detections threshold, whether activation of a gas leak alarm is required. For example, the predetermined number of gas leak detection cycles may be set to 20 and the predetermined gas leak detections threshold may be set to 17. In some embodiments, the predetermined gas leak detection threshold is set to reduce the false alarm ratio and to increase the probability of the gas leak alarm.

Figure 3A:
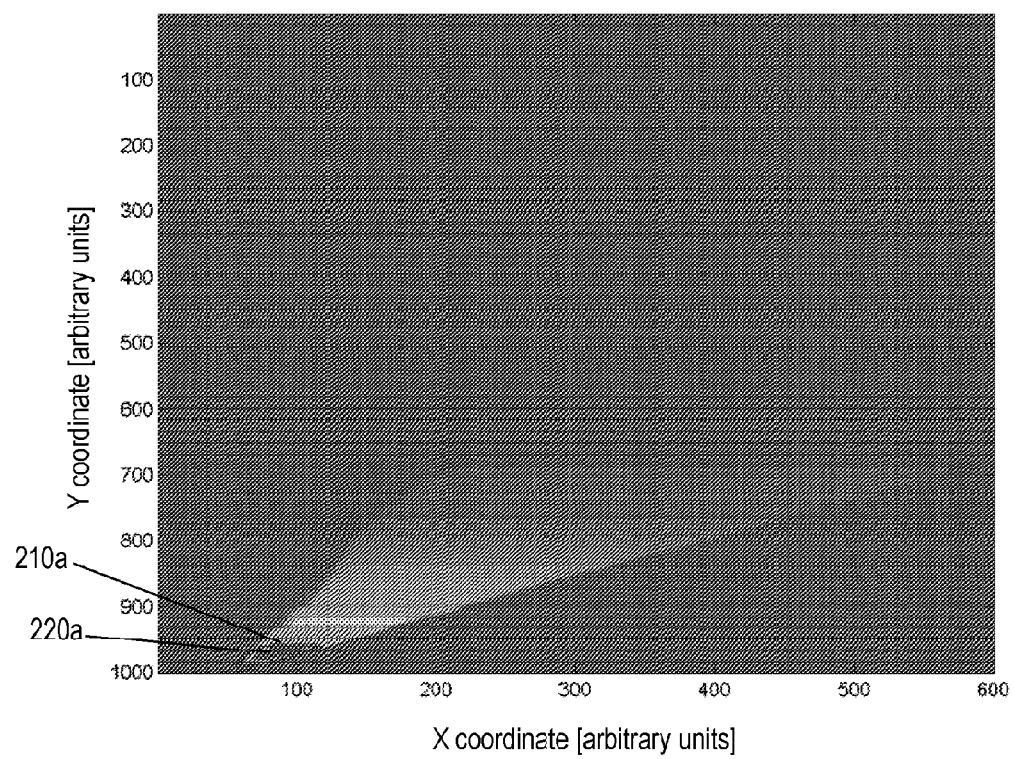
FIGS. 3A-3B are ratio images of the specified field of view, determined by a quantification unit of a system for quantifying a gas leak and/or for an automatic detection of the gas leak in a specified field of view for various leaking gas velocities, according to some embodiments of the invention.
Figure 3B:
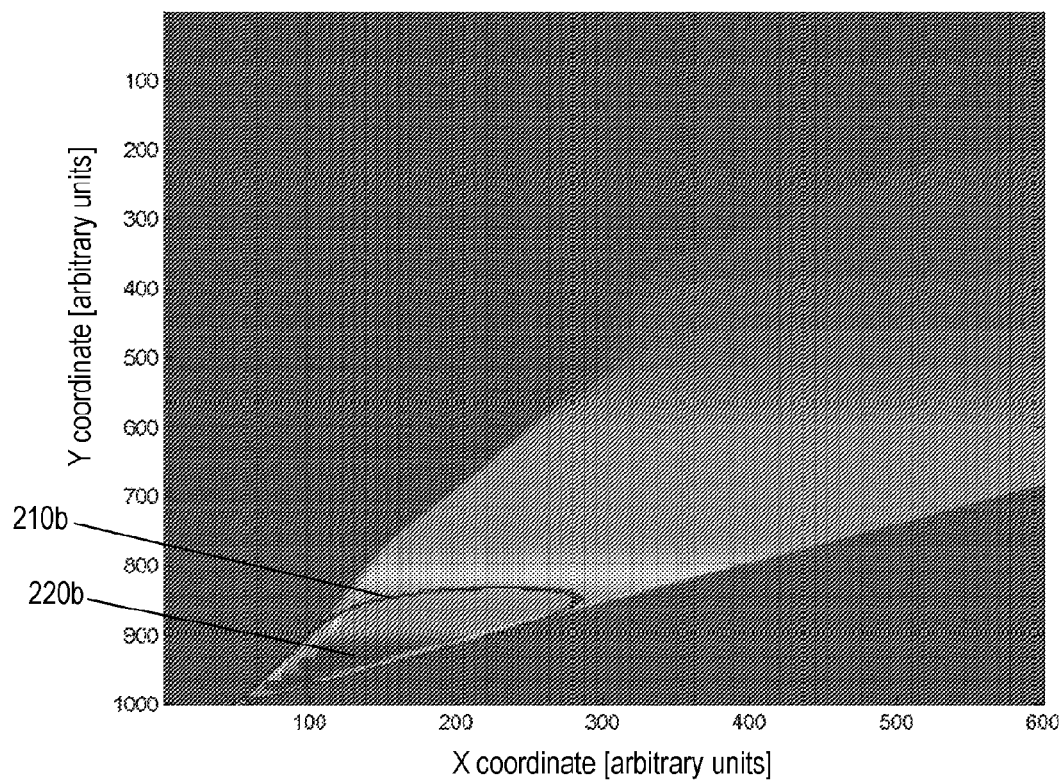

Reference is now made to FIGS. 3A-3B, which are ratio images 200 of a specified field of view, determined by a quantification unit, such as quantification unit 140, of a system for quantifying a gas leak and/or for an automatic detection of the gas leak in the specified field of view, such as system 100, for various leaking gas flowrates, according to some embodiments of the invention.

FIG. 3A and FIG. 3B show the simulated ratio image 200*a* and the simulated ratio image 200*b* of the specified field of view generated for a constant flowrate of the leaking gas of 1 gr/hour and 60 gr/hour, respectively. First region contours 210*a*, 210*b* in FIG. 3A and FIG. 3B indicate first regions 220*a*, 220*b*, respectively, comprising pixels having a signal to noise ratio (SNR) value that is below or above the predetermined SNR threshold value (e.g., as described above with respect to FIG. 2A). The grayscale levels in FIGS. 3A-3B indicate the leaking gas emissivity (or absorption), which may be proportional to the leaking gas local concentration.

Figure 4A:
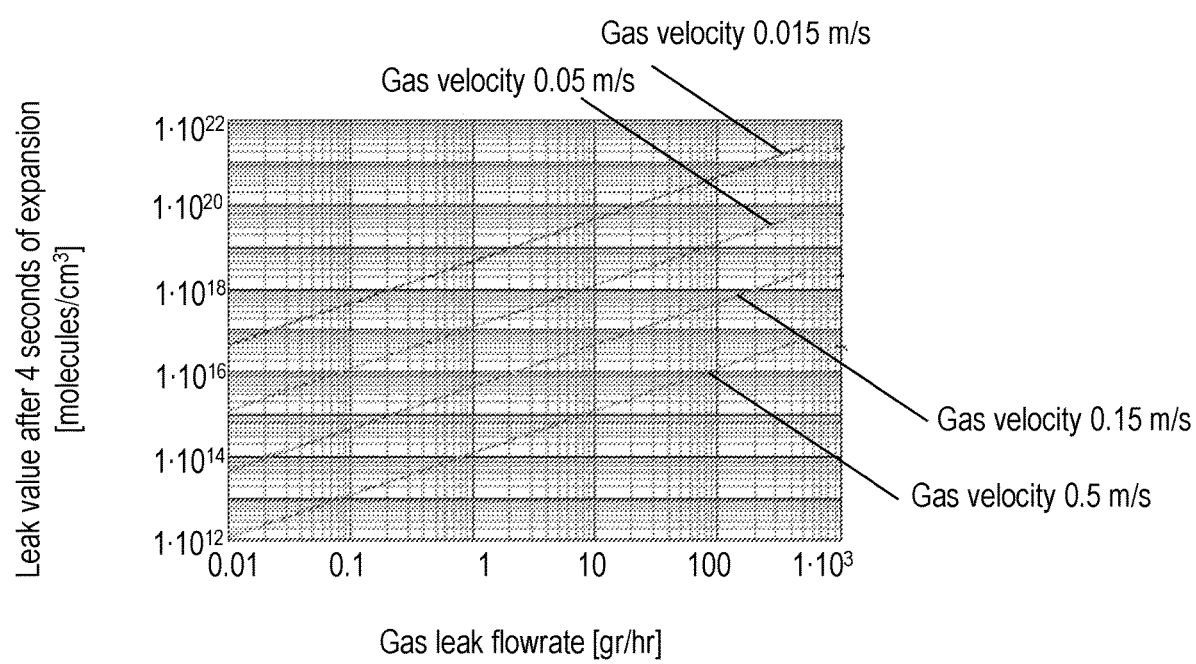
FIGS. 4A-4D are graphs showing specific gas parameters determined by a quantification unit of a system for quantifying a gas leak and/or for an automatic detection of the gas leak in a specified field of view, according to some embodiments of the invention.
Figure 4B:
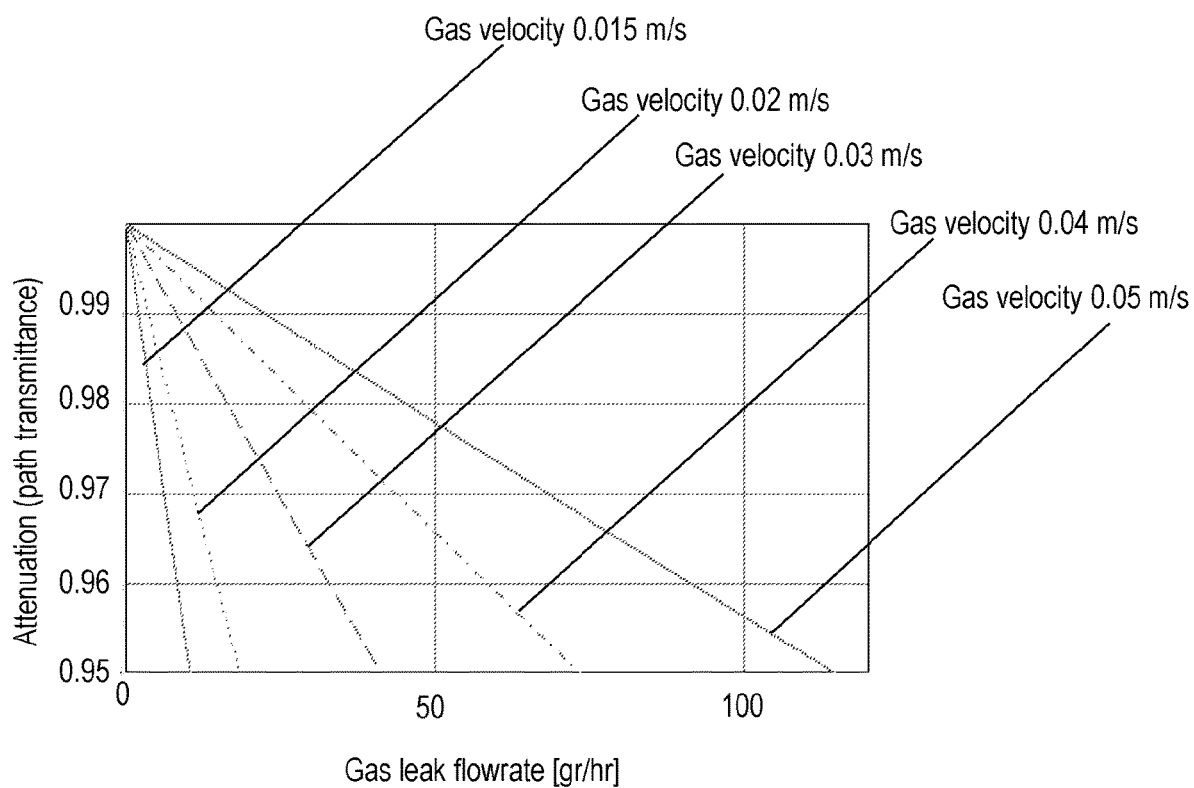
Figure 4C:
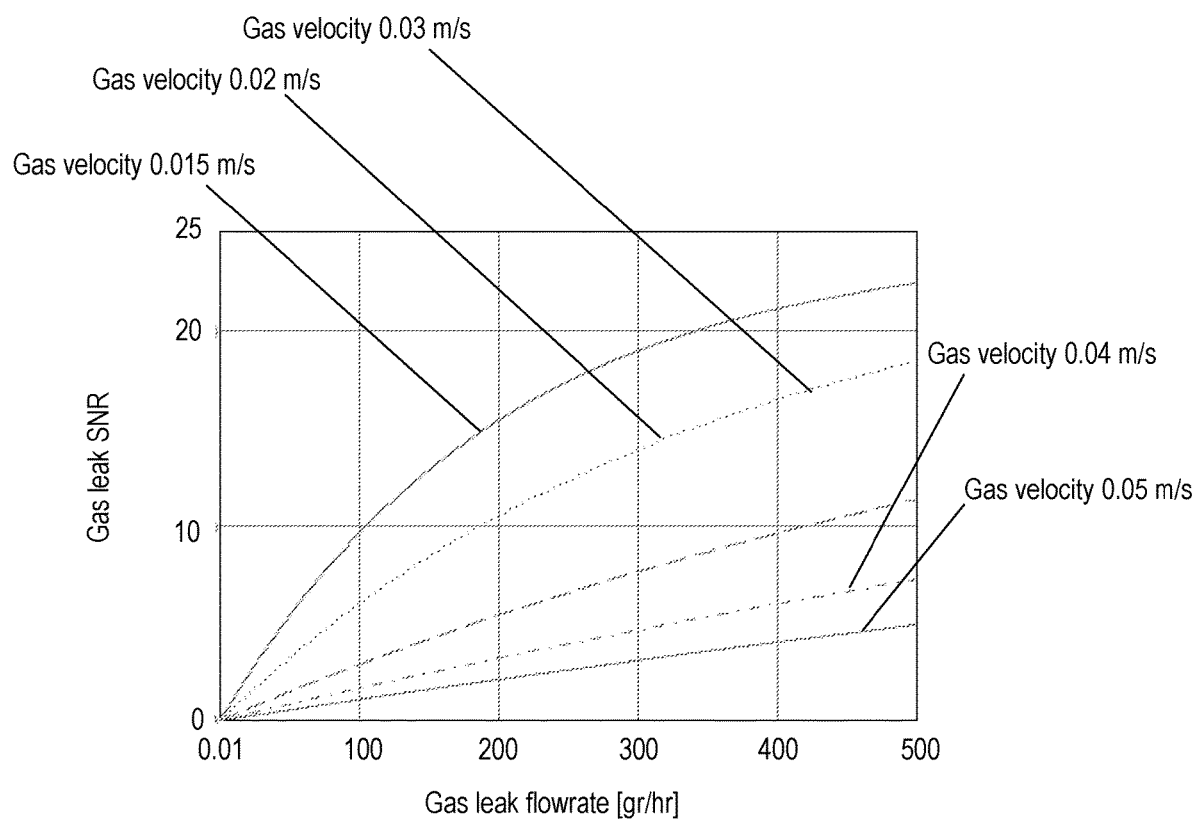
Figure 4D:
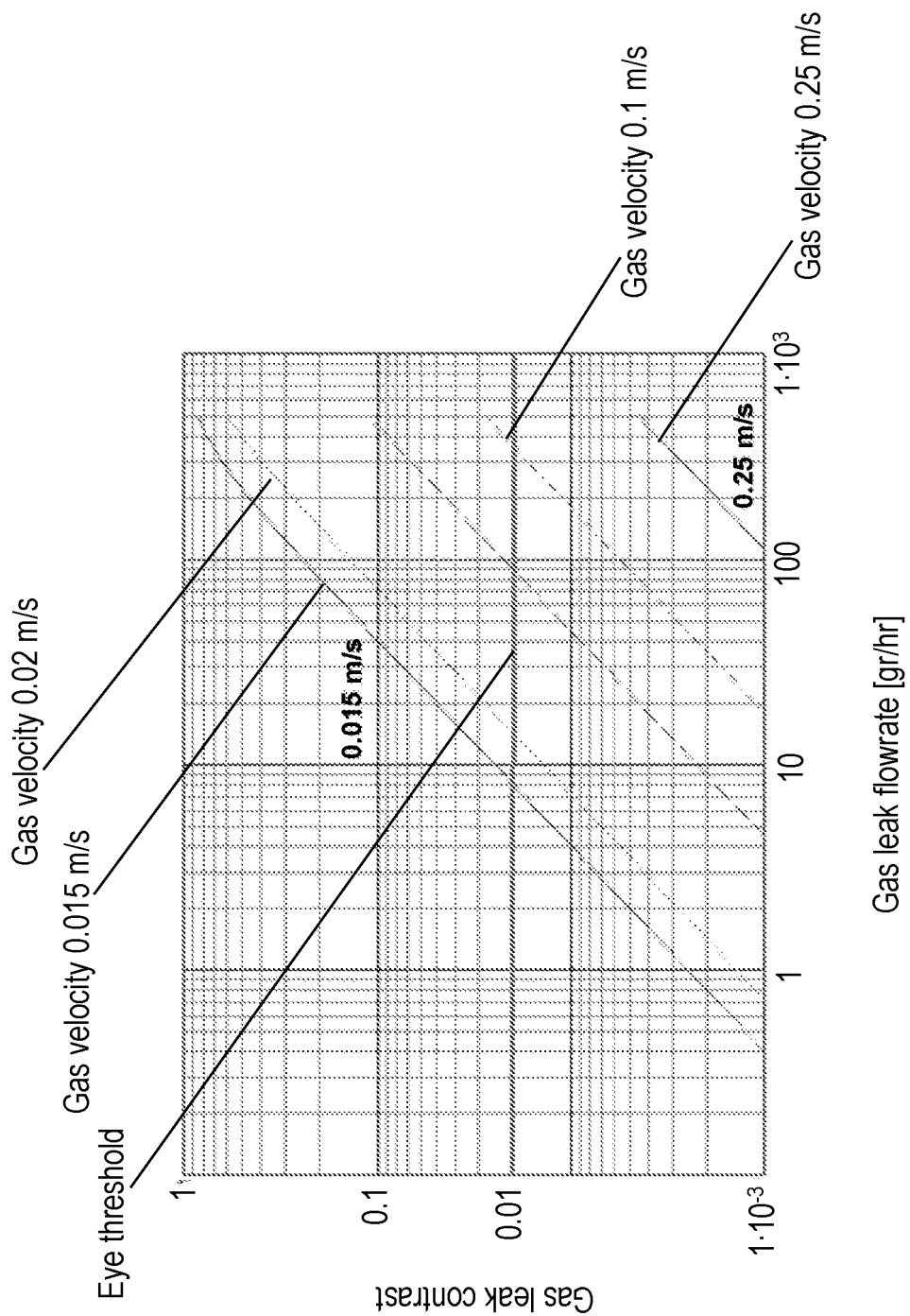

Reference is now made to FIGS. 4A-4D, which are graphs showing specific gas parameters determined by a quantification unit, such as quantification unit 140, of a system for quantifying a gas leak and/or for an automatic detection of the gas leak in a specified field of view, such as system 100, according to some embodiments of the invention. FIG. 4A shows a leak value of a leaking gas (e.g., in units of [gr/cm$^3$]) after 4 seconds of gas leak expansion as function of leaking gas flowrate for various leaking gas velocities. FIG. 4B shows a leaking gas attenuation (e.g., path transmittance) as function of leaking gas flowrate for various leaking gas velocities. FIG. 4C shows a leaking gas signal to noise ratio (SNR) as function of leaking gas flowrate for various leaking gas velocities. FIG. 4D shows a leaking gas contrast as function of leaking gas flowrate for various leaking gas velocities.

In some embodiments, quantification unit 140 is arranged to determine, based on the at least one ratio image, the flowrate of the leaking gas (e.g., $Q_{gas}$) and a velocity of the leaking gas, specific gas parameters concerning the leaking gas. The specific gas parameters may comprise, for example, a leaking gas concentration (e.g., as shown in FIG. 4A), a leaking gas path transmittance (e.g., as shown in FIG. 4B), a leaking gas SNR (e.g., as shown in FIG. 4C) and/or a leaking gas contrast (e.g., as shown in FIG. 4D).

Figure 5:
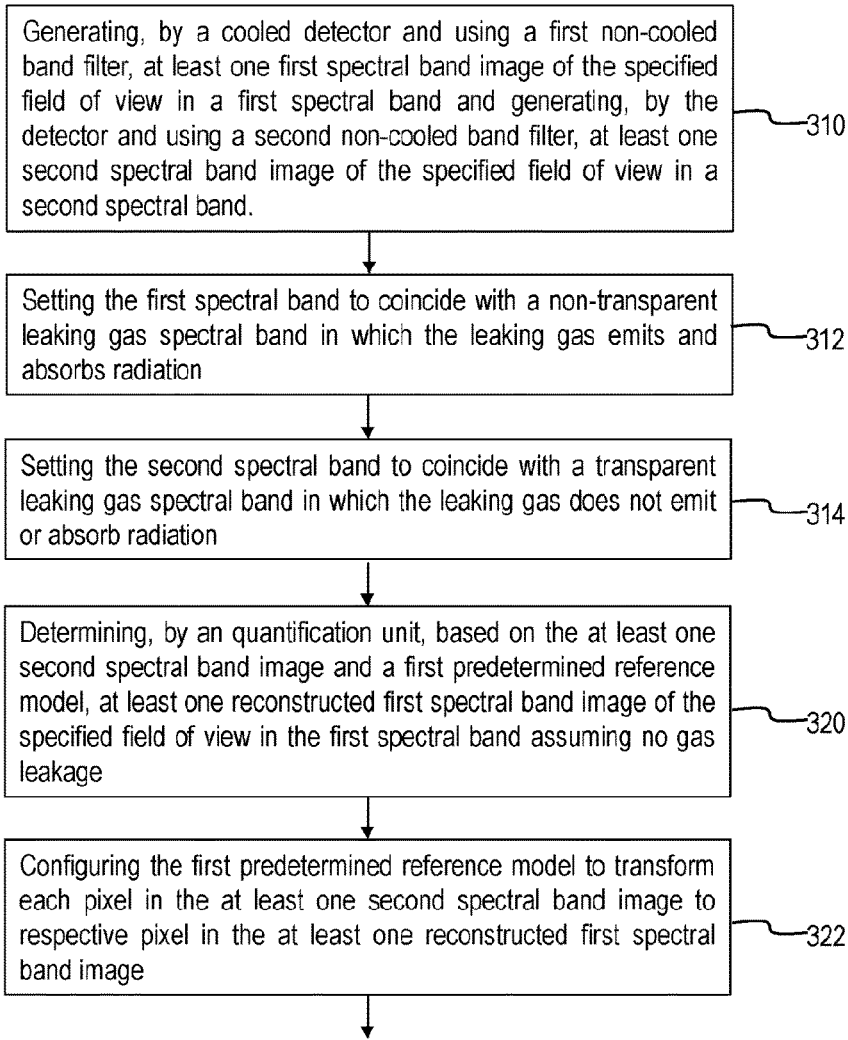
FIG. 5 is a flowchart of a method of quantifying a gas leak in a specified field of view, according to some embodiments of the invention.

Reference is now made to FIG. 5, which is a flowchart of a method 300 of quantifying a gas leak in a specified field of view, according to some embodiments of the invention. Method 300 may be implemented by system 100, which may be configured to implement method 300.

Method 300 may comprise generating 310, by a cooled detector and using a first non-cooled band-pass filter, at least one first spectral band image of the specified field of view in a first spectral band and generating, by the detector and using a second non-cooled band-pass filter, at least one second spectral band image of the specified field of view in a second spectral band.

In various embodiments, the detector is a cryogenically cooled detector, and/or none of the first non-cooled band-pass filter and the second non-cooled band-pass filter are subjected to means for temperature stabilization (e.g., as described above with respect to FIG. 1).

In some embodiments, method 300 further comprising setting 312 the first spectral band to coincide with a non-transparent leaking gas spectral band in which the leaking gas emits and absorbs electromagnetic radiation (e.g., as described above with respect to FIG. 1). In some embodiments, method 300 further comprising setting 314 the second spectral band to coincide with a transparent leaking gas spectral band in which the leaking gas does not emit or absorb electromagnetic radiation (e.g., as described above with respect to FIG. 1).

In various embodiments, each of the at least one first spectral band image and/or of the at least one second spectral band image are one of stills image(s) or video image(s).

Method 300 may comprise determining 320, by a quantification unit, based on the at least one second spectral band image and a first predetermined reference model, at least one reconstructed first spectral band image of the specified field of view in the first spectral band assuming no gas leakage (e.g., as described above with respect to FIG. 2A).

In some embodiments, method 300 further comprising configuring 322 the first predetermined reference model to transform each pixel in the at least one second spectral band image to respective pixel in the at least one reconstructed first spectral band image (e.g., as described above with respect to FIG. 2A).

Method 300 may comprise determining 330, by the quantification unit, by dividing the at least one first spectral band image by the at least one reconstructed first spectral band image, at least one ratio image (e.g., as described above with respect to FIG. 2A).

In some embodiments, method 300 further comprising determining 332 each pixel in the at least one ratio image by dividing respective pixel in the at least one first spectral band image by respective pixel in the at least one reconstructed first spectral band image (e.g., as described above with respect to FIG. 2A).

Method 300 may comprise determining 340, by the quantification unit, based on the at least one ratio image, specified imaging unit's parameters and specified leaking gas parameters, a mass of the leaking gas in each pixel of the at least one ratio image (e.g., as described above with respect to FIG. 2A).

Method 300 may comprise determining 350, by the quantification unit, based on the at least one ratio image, specified imaging unit's parameters, specified environmental conditions and a second predetermined reference model, a flowrate of the leaking gas in the specified field of view (e.g., as described above with respect to FIG. 2A and FIGS. 3A-3B).

In various embodiments, method 300 further comprising determining 352, in the at least one ratio image, a first region having a first region contour and comprising pixels having a signal to noise ratio (SNR) value that is above or below a predetermined SNR threshold value (e.g., as described above with respect to FIG. 2A and FIGS. 3A-3B). In some embodiments, method 300 further comprising determining 354, based on a number of pixels in the first region contour and specified imaging unit's parameters, a first region contour length of the first region (e.g., as described above with respect to FIG. 2A and FIGS. 3A-3B). In some embodiments, method 300 further comprising determining 356, based on a number of pixels in the first region and the specified imaging unit's parameters, a first region area of the first region (e.g., as described above with respect to FIG. 2A and FIGS. 3A-3B). In some embodiments, method 300 further comprising determining 358, based on the first region contour, the first region area and the specified environmental conditions, the flowrate of the leaking gas in the specified field of view (e.g., as described above with respect to FIG. 2A). In some embodiments, the specified environmental conditions comprise a leaking gas temperature, an ambient temperature and a wind velocity (e.g., as described above with respect to FIG. 2A).

In some embodiments, method 300 further comprising correcting 360 a non-uniformity and replacing bad pixels, by a non-uniformity correction and bad pixels replacement unit, the at least one first spectral band image and the at least one second spectral band image, prior to determining the at least one reconstructed spectral band image and prior to determining the at least one ratio image (e.g., as described above with respect to FIG. 1 and FIG. 2A).

In some embodiments, method 300 further comprising averaging 362, by the quantification unit, the at least one first spectral band image and averaging, by the quantification unit, the at least one second spectral band image, prior to determining the at least one reconstructed spectral band image and prior to determining the at least one ratio image (e.g., as described above with respect to FIG. 2A).

Figure 6:
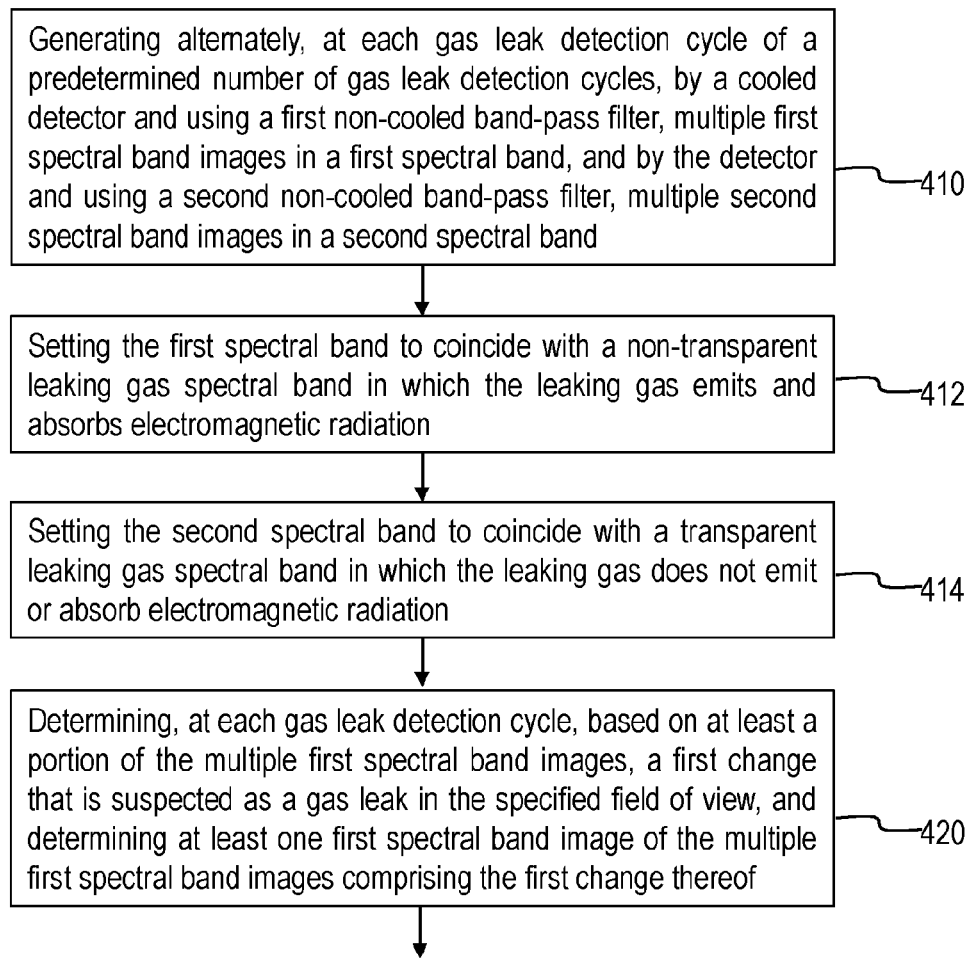
FIG. 6 is a flowchart of a method of an automatic gas leak detection in a specified field of view, according to some embodiments of the invention.

Reference is now made to FIG. 6, which is a flowchart of a method 400 of an automatic detection of a gas leak in a specified field of view, according to some embodiments of the invention. Method 400 may be implemented by system 100, which may be configured to implement method 400.

Method 400 may comprise generating alternately 410, at each gas leak detection cycle of a predetermined number of gas leak detection cycles, by a cooled detector and using a first non-cooled band-pass filter, multiple first spectral band images in a first spectral band, and by the detector and using a second non-cooled band-pass filter, multiple second spectral band images in a second spectral band.

In various embodiments, each of multiple first spectral band images and/or of the multiple second spectral band images are one of stills image(s) or video image(s).

In some embodiments, method 400 comprises setting 412 the first spectral band to coincide with a non-transparent leaking gas spectral band in which the leaking gas emits and absorbs electromagnetic radiation. In some embodiments, method 400 comprises setting 414 the second spectral band to coincide with a transparent leaking gas spectral band in which the leaking gas does not emit or absorb electromagnetic radiation.

In some embodiments, the detector is a cryogenically cooled detector (e.g., as described above with respect to FIG. 1). In some embodiments, none of the first non-cooled band-pass filter and the second non-cooled band-pass filter are subjected to means for temperature stabilization (e.g., as described above with respect to FIG. 1).

Method 400 may comprise determining 420, at each gas leak detection cycle, based on at least a portion of the multiple first spectral band images, a first change that is suspected as a gas leak in the specified field of view, and determining at least one first spectral band image of the multiple first spectral band images comprising the first change thereof.

Method 400 may comprise determining 422, at each gas leak detection cycle, based on at least a portion of the multiple second spectral band images, a second change that is suspected as a gas leak in the specified field of view, and determining at least one second spectral band image of the multiple first spectral band images comprising the second change thereof.

In various embodiments, each of the first change and/or the second change that are suspected as a gas leak may be due to, for example, air turbulence, water vapors release, steam release, dust flow and/or the gas leak in the specified field of view.

Method 400 may comprise determining 424, at each gas leak detection cycle, based on at least one of the determined first change, the determined second change, the at least one first spectral band image comprising the first change and the at least one second spectral band image comprising the second change, whether the first change and/or the second change is a gas leak.

Method 400 may comprise determining 430 a total number of gas leak detections in the predetermined number of gas detection cycles and further determining, based on the total number of gas detections and a predetermined gas leak detections threshold, whether activation of a gas leak alarm is required.

In various embodiments, method 400 comprises setting 432 the predetermined gas leak detections threshold to reduce the false alarm ratio and/or to increase the probability of the gas leak alarm.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for quantifying a gas leak in a specified field of view, the system comprising:
 an imaging unit comprising a single cryogenically cooled detector arranged to detect electromagnetic radiation within a specified spectral band;
 a filters assembly comprising:
  a first non-cooled band-pass filter arranged to transmit electromagnetic radiation ranging within a first spectral band;
  a second non-cooled band-pass filter arranged to transmit electromagnetic radiation ranging within a second spectral band; and
  a filters switching mechanism arranged to interchange between the first non-cooled band-pass filter and the second non-cooled band-pass filter to thereby position the first non-cooled band-pass filter or the second non-cooled band-pass filter in front of the cryogenically cooled detector;
 wherein none of the first non-cooled band-pass filter and the second non-cooled band-pass filter are subjected to means for temperature stabilization; and
 wherein the first spectral band coincides with a non-transparent leaking gas spectral band in which the leaking gas emits and absorbs electromagnetic radiation, wherein the second spectral band coincides with a transparent leaking gas spectral band in which the leaking gas does not emit or absorb electromagnetic radiation, and wherein the specified spectral band includes the first spectral band and the second spectral band;
 wherein the cryogenically cooled detector is arranged to generate, using the first non-cooled band-pass filter at least one first spectral band image of the field of view in the first spectral band and to generate using the second non-cooled band-pass filter, upon interchanging between the first non-cooled band pass filter and the second non-cooled band pass filter, at least one second spectral band image of the field of view in the second spectral band; and
 a quantification unit arranged to:
  receive the at least one first spectral band image and to receive the at least one second spectral band image;
  determine, based on the at least one second spectral band image and a first predetermined reference model, at least one reconstructed first spectral band image of the specified field of view in the first spectral band assuming no gas leakage; and
  determine, by dividing the at least one first spectral band image by the at least one reconstructed first spectral band image, at least one ratio image.

2. The system of claim 1, wherein the cryogenically cooled detector is arranged to operate within a mid-wave infrared range and within a longwave infrared range.

3. The system of claim 1, wherein the first predetermined reference model is arranged to transform each pixel in the at least one second spectral band image to respective pixel in the at least one reconstructed first spectral band image.

4. The system of claim 1, wherein each pixel in the at least one ratio image is determined by dividing respective pixel in the at least one first spectral band image by respective pixel in the at least one reconstructed first spectral band image.

5. The system of claim 1, wherein the quantification unit is further arranged to determine, based on the at least one ratio image, specified imaging unit's parameters and specified leaking gas parameters, a mass of the leaking gas in each pixel of the at least one ratio image.

6. The system of claim 1, wherein the quantification unit is further arranged to determine, based on the at least one ratio image, specified imaging unit's parameters, specified environmental conditions and a second predetermined reference model, a flowrate of the leaking gas in the specified field of view.

7. The system of claim 6, wherein the quantification unit is further arranged to:
 determine, in the at least one ratio image, a first region having a first region contour and comprising pixels having a signal to noise ratio (SNR) value that is above or below a predetermined SNR threshold value;
 determine, based on a number of pixels in the first region contour and specified imaging unit's parameters, a first region contour length of the first region contour;
 determine, based on a number of pixels in the first region and the specified imaging unit's parameters, a first region area of the first region; and
 determine, based on the first region contour length, the first region area and the specified environmental conditions, the flowrate of the leaking gas in the specified field of view,
 wherein the specified environmental conditions comprise a leaking gas temperature, an ambient temperature and a wind velocity.

8. The system of claim 1, further comprising a non-uniformity (NUC) and bad pixels replacement (BPR) unit arranged to NUC and BPR the at least one first spectral band image and the at least one second spectral band image, prior to reception of the images thereof by the quantification unit, and wherein the quantification unit is further arranged to average the at least one first spectral band image and to average the at least one second spectral band image, prior to determining the at least one reconstructed spectral band image and prior to determining the at least one ratio image.

9. The system of claim 1, wherein the cryogenically cooled detector is arranged to generate alternately, at each gas leak detection cycle of a predetermined number of gas leak detection cycles, multiple first spectral band images of the specified field of view and multiple second spectral band images of the specified field of view.

10. The system of claim 9, further comprising a detection unit arranged to:
 receive, at each gas leak detection cycle of the predetermined number of gas leak detection cycles, the alternately generated multiple first spectral band images and multiple second spectral band images;
 determine, at each gas leak detection cycle, based on at least a portion of the multiple first spectral band images, a first change that is suspected as a gas leak in the specified field of view, and to determine at least one first spectral band image of the multiple first spectral band images comprising the first change thereof;

determine, at each gas leak detection cycle, based on at least a portion of the multiple second spectral band images, a second change that is suspected as a gas leak in the specified field of view, and determine at least one second spectral band image of the multiple first spectral band images comprising the second change thereof;

determine, at each gas leak detection cycle, based on at least one of the determined first change, the determined second change, the at least one first spectral band image comprising the first change and the at least one second spectral band image comprising the second change, whether the first change and/or the second change is a gas leak; and determine a total number of gas leak detections in the predetermined number of gas detection cycles and further to determine, based on the total number of gas detections and a predetermined gas leak detections threshold, whether activation of a gas leak alarm is required.

11. A method of quantifying a leaking gas in a specified field of view, the method comprising:

generating, by a single cryogenically cooled detector and using a first non-cooled band-pass filter, at least one first spectral band image of the specified field of view in a first spectral band coinciding with a non-transparent leaking gas spectral band in which the leaking gas emits and absorbs electromagnetic radiation and generating, by the cryogenically cooled detector and using a second non-cooled band-pass filter, upon interchanging between the first non-cooled band pass filter and the second non-cooled band pass filter, at least one second spectral band image of the specified field of view in a second spectral band coinciding with a transparent leaking gas spectral band in which the leaking gas does not emit or absorb electromagnetic radiation, wherein none of the first non-cooled band-pass filter and the second non-cooled band-pass filter are subjected to means for temperature stabilization;

determining, by a quantification unit, based on the at least one second spectral band image and a first predetermined reference model, at least one reconstructed first spectral band image of the specified field of view in the first spectral band assuming no gas leakage; and determining, by the quantification unit, by dividing the at least one first spectral band image by the at least one reconstructed first spectral band image, at least one ratio image.

12. The method of claim 11, further comprising configuring the first predetermined reference model to transform each pixel in the at least one second spectral band image to respective pixel in the at least one reconstructed first spectral band image.

13. The method of claim 11, further comprising determining each pixel in the at least one ratio image by dividing respective pixel in the at least one first spectral band image by respective pixel in the at least one reconstructed first spectral band image.

14. The method of claim 11, further comprising determining, by the quantification unit, based on the at least one ratio image, specified imaging unit's parameters and specified leaking gas parameters, a mass of the leaking gas in each pixel of the at least one ratio image.

15. The method of claim 11, further comprising:

determining, in the at least one ratio image, a first region having a first region contour and comprising pixels having a signal to noise ratio (SNR) value that is above or below a predetermined SNR threshold value;

determining, based on a number of pixels in the first region contour and specified imaging unit's parameters, a first region contour length of the first region contour;

determining, based on a number of pixels in the first region and the specified imaging unit's parameters, a first region area of the first region; and determining, based on at least one of the at least one ratio image, the first region contour length, the first region area and the specified environmental conditions, a flowrate of the leaking gas in the specified field of view;

wherein the specified environmental conditions comprise a leaking gas temperature, an ambient temperature and a wind velocity.

16. The method of claim 11, further comprising correcting a non-uniformity and replacing bad pixels, by a non-uniformity correction and bad pixels replacement unit, in the at least one first spectral band image and in the at least one second spectral band image, prior to determining the at least one reconstructed spectral band image and prior to determining the at least one ratio image, and further comprising averaging, by the quantification unit, the at least one first spectral band image and averaging, by the quantification unit, the at least one second spectral band image, prior to determining the at least one reconstructed spectral band image and prior to determining the at least one ratio image.

17. A system for automatically detecting a gas leak in a specified field of view, the system comprising:

an imaging unit comprising a single cryogenically cooled detector arranged to detect electromagnetic radiation within a specified spectral band;

a filters assembly comprising:

a first non-cooled band-pass filter arranged to transmit electromagnetic radiation ranging within a first spectral band;

a second non-cooled band-pass filter arranged to transmit electromagnetic radiation ranging within a second spectral band; and a filters switching mechanism arranged to interchange between the first non-cooled band-pass filter and the second non-cooled band-pass filter to thereby position the first non-cooled band-pass filter or the second non-cooled band-pass filter in front of the cryogenically cooled detector;

wherein none of the first non-cooled band-pass filter and the second non-cooled band-pass filter are subjected to means for temperature stabilization; and wherein the first spectral band coincides with a non-transparent leaking gas spectral band in which the leaking gas emits and absorbs electromagnetic radiation, wherein the second spectral band coincides with a transparent leaking gas spectral band in which the leaking gas does not emit or absorb electromagnetic radiation, and wherein the specified spectral band includes the first spectral band and the second spectral band;

wherein the cryogenically cooled detector is arranged to generate, by alternately interchanging between the first non-cooled band pass filter and the second non-cooled band pass filter, at each gas leak detection cycle of a predetermined number of gas leak detection cycles, multiple first spectral band images of the specified field of view in the first spectral band using the first non-cooled band-pass filter and multiple second spectral band images of the specified field of view in the second spectral band using the second non-cooled band-pass filter; and a detection unit arranged to:

receive, at each gas leak detection cycle of the predetermined number of gas leak detection cycles, the alternately generated multiple first spectral band images and multiple second spectral band images;

determine, at each gas leak detection cycle, based on at least a portion of the multiple first spectral band images, a first change that is suspected as a gas leak in the specified field of view, and to determine at least one first spectral band image of the multiple first spectral band images comprising the first change thereof;

determine, at each gas leak detection cycle, based on at least a portion of the multiple second spectral band images, a second change that is suspected as a gas leak in the specified field of view, and to determine at least one second spectral band image of the multiple first spectral band images comprising the second change thereof;

determine, at each gas leak detection cycle, based on at least one of the determined first change, the determined second change, the at least one first spectral band image comprising the first change and the at least one second spectral band image comprising the second change, whether the first change and/or the second change is a gas leak; and determine a total number of gas leak detections in the predetermined number of gas detection cycles and further to determine, based on the total number of gas detections and a predetermined gas leak detections threshold, whether activation of a gas leak alarm is required.

18. The system of claim 17, wherein the cryogenically cooled detector is arranged to operate within a mid-wave infrared range and within a longwave infrared range.

* * * * *